United States Patent
Yamaguchi

(10) Patent No.: US 9,416,047 B2
(45) Date of Patent: Aug. 16, 2016

(54) OPTICAL GLASS, GLASS MATERIAL FOR PRESS MOLDING, AND OPTICAL ELEMENT

(71) Applicant: HOYA CORPORATION, Tokyo (JP)

(72) Inventor: Kosuke Yamaguchi, Tokyo (JP)

(73) Assignee: HOYA CORPORATION, Tokyo (JP)

(*) Notice: Subject to any disclaimer, the term of this patent is extended or adjusted under 35 U.S.C. 154(b) by 0 days.

(21) Appl. No.: 14/758,346

(22) PCT Filed: Dec. 26, 2013

(86) PCT No.: PCT/JP2013/084969
§ 371 (c)(1),
(2) Date: Jun. 29, 2015

(87) PCT Pub. No.: WO2014/104232
PCT Pub. Date: Jul. 3, 2014

(65) Prior Publication Data
US 2015/0353407 A1 Dec. 10, 2015

(30) Foreign Application Priority Data
Dec. 27, 2012 (JP) ................................. 2012-285215

(51) Int. Cl.
*C03C 3/064* (2006.01)
*C03C 3/14* (2006.01)
*C03B 11/00* (2006.01)
*C03C 3/068* (2006.01)
*G02B 1/00* (2006.01)
*C03C 3/066* (2006.01)

(52) U.S. Cl.
CPC .............. *C03C 3/064* (2013.01); *C03B 11/00* (2013.01); *C03C 3/066* (2013.01); *C03C 3/068* (2013.01); *C03C 3/14* (2013.01); *G02B 1/00* (2013.01); *C03B 2215/46* (2013.01)

(58) Field of Classification Search
CPC ............ C03C 3/064; C03C 3/15; C03C 3/14; C03B 13/02; C03B 11/00
See application file for complete search history.

(56) References Cited

U.S. PATENT DOCUMENTS

| | | | |
|---|---|---|---|
| 4,213,787 A * | 7/1980 | Faulstich | C03C 3/062 501/74 |
| 6,333,288 B1 | 12/2001 | Clement et al. | |
| 6,413,894 B1 | 7/2002 | Sato | |
| 2005/0061030 A1* | 3/2005 | Ichinose | C03B 5/193 65/29.17 |
| 2007/0249480 A1 | 10/2007 | Kobayashi et al. | |
| 2009/0042711 A1 | 2/2009 | Zou et al. | |
| 2011/0263410 A1* | 10/2011 | Negishi | C03B 5/1675 501/78 |
| 2012/0142516 A1* | 6/2012 | Fujiwara | C03C 3/21 501/46 |
| 2012/0220442 A1 | 8/2012 | Ogino et al. | |

FOREIGN PATENT DOCUMENTS

| | | |
|---|---|---|
| JP | S54-161620 A | 12/1979 |
| JP | 2000-016830 A | 1/2000 |
| JP | 2000-344542 A | 12/2000 |
| JP | 2007-254197 A | 10/2007 |
| JP | 2009-040647 A | 2/2009 |
| JP | 2011-116621 A | 6/2011 |

OTHER PUBLICATIONS

Mar. 25, 2014 Search Report issued in International Application No. PCT/JP2013/084969.
Mar. 25, 2014 Written Opinion issued in International Application No. PCT/JP2013/084969.

* cited by examiner

*Primary Examiner* — Elizabeth A Bolden
(74) *Attorney, Agent, or Firm* — Oliff PLC

(57) ABSTRACT

Provided are an optical glass with a high refractive index which has excellent devitrification resistance both in a molten state and during reheating, and a glass material for press molding and an optical element which are comprised of the optical glass. This optical glass includes, in mass %, 15-37% of $B_2O_3$ and $SiO_2$ in total, 15-45% of $TiO_2$, $Nb_2O_5$ and $ZrO_2$ in total, and 12-40% of BaO, SrO, CaO, MgO, $K_2O$, $Na_2O$ and $Li_2O$ in total, has a mass ratio ($B_2O_3/(B_2O_3+SiO_2)$) of 0.15 or more, a mass ratio ($TiO_2/(TiO_2+Nb_2O_5+ZrO_2)$) of 0.01 to 0.8, a mass ratio ((BaO+SrO+CaO)/(BaO+SrO+CaO+MgO+$K_2O$+$Na_2O$+$Li_2O$)) of 0.4 or more, and a mass ratio (($K_2O$+$Na_2O$+$Li_2O$)/(BaO+SrO+CaO+MgO+$K_2O$+$Na_2O$+$Li_2O$)) of 0.1 or more, substantially does not include PbO, and has a refractive index nd of 1.78-1.84, and an Abbe's number vd of 26-32.

10 Claims, No Drawings

OPTICAL GLASS, GLASS MATERIAL FOR PRESS MOLDING, AND OPTICAL ELEMENT

BACKGROUND OF THE INVENTION

1. Field of the Invention

The present invention relates to an optical glass, a glass material for press molding, and an optical element. More particularly, the present invention relates to an optical glass with a high refractive index, which is excellent in both devitrification resistance in a molten state and devitrification resistance during reheating, and a glass material for press molding and an optical element which are comprised of the optical glass.

2. Description of Related Art

An optical glass having a high refractive index of 1.7 or more, which is suitable for an optical element such as a lens, is disclosed in Patent Documents 1 to 3.

CITATION LIST

Patent Document (Patent Document 1) Japanese Patent Laid-Open Publication No. 2000-344542
(Patent Document 2) Japanese Patent Laid-Open Publication No. 2007-254197
(Patent Document 3) Japanese Patent Laid-Open Publication No. 2000-16830

SUMMARY OF THE INVENTION

Technical Problem

A high-quality optical element may be manufactured through processes of heating, softening, and molding a glass. In this case, if devitrification resistance of the glass in a molten state at the time of molding the glass from the molten state ((1) devitrification resistance of the glass in the molten state) is low, the glass may be undesirably devitrified while the molten glass is quenched and molded. Further, if only the devitrification resistance at the time of molding the glass from the molten state is excellent but devitrification resistance at the time of reheating, softening and molding a glass material using the molded glass as a molding material ((2) devitrification resistance when the glass material is reheated, softened and molded) is low, a resulting molded article may be likewise devitrified.

As such, in order to produce an optical element that contains no crystal and is optically homogeneous, it is required to improve both the (1) devitrification resistance of the glass in the molten state and the (2) devitrification resistance when the glass material is reheated, softened and molded. However, in the case of the high-refractive-index optical glass, it is not easy to improve all of the two types of devitrification resistance.

In this regard, a glass described in Patent Documents 1 and 3 has room to be improved in both the devitrification resistance of the glass in the molten state and the devitrification resistance when the glass material is heated, softened and molded. On the other hand, a glass described in Patent Document 2 is excellent in the devitrification resistance when the glass material is heated, softened and molded, but is not so good in the devitrification resistance of the glass in the molten state.

Accordingly, an object of the present invention is to provide an optical glass with a high refractive index, which is excellent in both devitrification resistance of glass in a molten state and devitrification resistance when a glass material is reheated, softened and molded, and a glass material for press molding and an optical element which are comprised of the optical glass.

Solution to Problem

The present invention provides an optical glass comprising:
in mass %,
15 to 37% of $B_2O_3$ and $SiO_2$ in total,
15 to 45% of $TiO_2$, $Nb_2O_5$ and $ZrO_2$ in total, and
12 to 40% of BaO, SrO, CaO, MgO, $K_2O$, $Na_2O$ and $Li_2O$ in total,
wherein the optical glass has:
a mass ratio ($B_2O_3/(B_2O_3+SiO_2)$) of 0.15 or more,
a mass ratio ($TiO_2/(TiO_2+Nb_2O_5+ZrO_2)$) of 0.01 to 0.8,
a mass ratio ((BaO+SrO+CaO)/(BaO+SrO+CaO+MgO+$K_2O+Na_2O+Li_2O$)) of 0.4 or more, and
a mass ratio (($K_2O+Na_2O+Li_2O$)/(BaO+SrO+CaO+MgO+$K_2O+Na_2O+Li_2O$)) of 0.1 or more,
wherein the optical glass substantially contains no PbO, and
wherein the optical glass has a refractive index nd of 1.78 to 1.84, and an Abbe's number vd of 26 to 32.

Advantageous Effects of Invention

According to the present invention, it is possible to provide an optical glass with a high refractive index, which is excellent in both devitrification resistance in a molten state and devitrification resistance during reheating, and a glass material for press molding and an optical element which are composed of the optical glass.

DETAILED DESCRIPTION OF EXEMPLARY EMBODIMENTS

If the temperature of glass melt is gradually lowered to a temperature range which is lower than a temperature referred to as a liquidus temperature, a crystalline phase becomes more stable. Hence, crystals start to be precipitated in the melt. The precipitated crystals do not disappear unless the temperature of the glass melt rises up. The cooling of the glass melt in which crystals precipitate out results in a glass containing crystal grains therein. If light is irradiated onto such a glass, the light is scattered by the crystal grains and thereby the glass becomes opaque. That is, the glass experiences ⌈devitrification⌋.

Crystal precipitation occurs when constituents in the glass melt are microscopically regularly arranged. Therefore, if the glass melt is quenched and solidified before such a regular arrangement occurs, it is possible to manufacture a transparent glass without precipitating the crystals.

Further, if a glass containing no solidified crystal is reheated, viscosity is decreased, so that the regular arrangement (crystal precipitation) of the constituents in the glass occurs. If the temperature of the glass in which crystals precipitate out further rises up and thereby reaches the liquidus temperature, the crystal is melted and consequently homogeneous glass melt is obtained.

(1) Devitrification Resistance of Glass in Molten State

In the present invention, after the glass solidified once is reheated and crystals precipitate out, its temperature is further increased to melt and eliminate the crystals. This temperature is referred to as a liquidus temperature. The lower liquidus temperature allows devitrification to be avoided even if the glass melt is handled at a low temperature, thus making it easy to manufacture the glass. In other words, the lower the liquidus temperature is, the higher the devitrification resistance of the glass in the molten state is. In the present invention, the liquidus temperature is used as an index of the (1) devitrification resistance of the glass in the molten state.

[Liquidus Temperature LT]

In the present invention, a preferable range of the liquidus temperature is 1120° C. or less. A more preferable range of the liquidus temperature is 1115° C. or less, a much more preferable range thereof is 1110° C. or less, and a still more preferable range thereof is 1100° C. A lower limit of the liquidus temperature is naturally determined from a composition of the present invention. As a reference, 900° C. may be considered to be the lower limit of the liquidus temperature.

By lowering the liquidus temperature, it is possible to obtain the following effects.

(1) It is easy to mold the glass melt.

(2) Since a melting temperature may be set low, a very small amount of platinum ions may be dissolved into a glass even if the glass is melted in a platinum vessel. As a result, it is possible to suppress the coloring of the glass due to the platinum ions.

(3) Since the melting temperature may be set low, it is possible to suppress the amount of volatilization of the glass melt, and thereby various characteristics including optical properties such as a refractive index or an Abbe's number may be stabilized. The generation of striae resulting from the volatilization may be suppressed, so that it is possible to obtain a high-quality optical glass.

(4) When rough melting is performed using a device made of a non-metallic material such as silica, it is possible to suppress the corrosion of the non-metallic device by a glass melt because a rough melting temperature can be set low. Therefore, it is possible to suppress a change in optical properties due to the dissolving of the non-metallic material such as silica.

(2) Devitrification Resistance when a Glass Melt is Quenched, Solidified and then Reheated If the solidified glass is reheated, the freezing of atomic molecules is released, and thus the precipitation of the crystals is started. The lowest temperature at which the crystal precipitation begins is a crystallization peak temperature Tx. When the solidified glass is reheated and molded, it is impossible to mold the glass unless the glass is softened. However, if the temperature of the glass during softening is too close to the crystallization peak temperature Tx, the glass is inevitably devitrified. Thus, the larger Tx—softening temperature enables the glass to be more easily molded without causing the devitrification. In the present invention, a glass transition temperature Tg that is easily measurable is used instead of the softening temperature, and thereby Tx–Tg is adopted as the index of the (2) devitrification resistance when the glass melt is quenched, solidified and then reheated.

[Crystallization Peak Temperature Tx and Glass Transition Temperature Tg]

The crystallization peak temperature Tx is measured as follows. First, a glass is sufficiently pulverized by use of in a mortar and the pulverized glass powder is used as a sample, and measurement is carried out using a high temperature differential scanning calorimeter. The heat generation amount and the heat absorption amount of the sample are measured while the temperature of the sample is increased. If the temperature of the sample is plotted on a horizontal axis and the heat generation amount and the heat absorption amount of the sample are plotted on a vertical axis, a differential scanning calorimetry curve (DSC curve) is obtained. In a differential scanning calorimetry analysis, if the temperature of the sample rises up, an endothermic peak appears. In addition, if the temperature of the sample further rises up, an exothermic peak appears. A point where the exothermic peak starts to appear is the crystallization peak temperature (Tx). An intersection of a baseline of the DSC curve and a tangent line at a point where a gradient is maximum when the exothermic peak appears from the baseline in the differential scanning calorimetry curve (DSC curve) is set as the crystallization peak temperature (Tx).

In the present invention, in order to improve the devitrification resistance during reheating, a temperature difference $\Delta T$ between the crystallization peak temperature Tx and the glass transition temperature Tg is preferably 95° C. or more.

In order to improve the devitrification resistance of the glass during reheating, the lower limit of the temperature difference $\Delta T$ is preferably 100° C., more preferably 110° C., much more preferably 120° C., far more preferably 130° C., still more preferably 140° C., and even still more preferably 150° C. The upper limit of the temperature difference $\Delta T$ is naturally determined from the composition of the present invention. As a reference, 250° C. may be considered to be the upper limit of the temperature difference $\Delta T$.

In order to improve the devitrification resistance of the glass during reheating, the lower limit of the crystallization peak temperature Tx is preferably 500° C., more preferably 550° C., and much more preferably 600° C. In order to realize desired optical properties and the devitrification resistance in the molten state, the upper limit of the crystallization peak temperature Tx is preferably 950° C., more preferably 900° C., and much more preferably 850° C.

In order to suppress thermal consumption of production facilities by performing molding of the glass by reheating, and gradual cooling following the molding at a lower temperature, the upper limit of the glass transition temperature Tg is preferably 750° C., more preferably 700° C., and much more preferably 650° C.

In order to realize the desired optical properties and the devitrification resistance in the molten state, the lower limit of the glass transition temperature Tg is preferably 350° C., more preferably 400° C., and much more preferably 450° C.

Further, since the optical glass of the present invention is suitable for molding by a reheat press method that will be described below and has a low glass transition temperature, this optical glass is suitable as a glass for precision press molding.

Hereinafter, an exemplary embodiment of the present invention will be described.

[Glass Composition]

Unless otherwise stated herein, the content and the total content of glass components are indicated in mass %. Further, a ratio between contents of the glass components is represented by a mass ratio.

$(B_2O_3+SiO_2)$

Both $B_2O_3$ and $SiO_2$ are network forming components of the glass. In order to provide good thermal stability for the glass, the total content $(B_2O_3+SiO_2)$ of $B_2O_3$ and $SiO_2$ is set to be 15% or more. Meanwhile, if the total content of $B_2O_3$ and $SiO_2$ exceeds 37%, it is difficult to maintain the required optical properties. Therefore, the total content of $B_2O_3$ and $SiO_2$ is in the range of 15 to 37%.

Further, the thermal stability of the glass means both the (1) devitrification resistance of the glass in the molten state and the (2) devitrification resistance when the glass melt is reheated after being quenched and solidified.

In order to improve the thermal stability, the lower limit of the $B_2O_3+SiO_2$ is preferably 17%, more preferably 19%, much more preferably 21%, and still more preferably 23%. In order to maintain the required optical properties, the upper limit of the $B_2O_3+SiO_2$ is preferably 35%, more preferably 33%, much more preferably 31%, still more preferably 29%, and even still more preferably 28.5%.

($B_2O_3/(B_2O_3+SiO_2)$)

However, if the total content of the $B_2O_3$ and $SiO_2$ falls within the above-described range, but the mass ratio ($B_2O_3/(B_2O_3+SiO_2)$) of the content of $B_2O_3$ to the total content of $B_2O_3$ and $SiO_2$ is less than 0.15, the liquidus temperature rises up and thereby the devitrification resistance of the glass in the molten state is deteriorated. Accordingly, the mass ratio ($B_2O_3/(B_2O_3+SiO_2)$) is 0.15 or more.

In order to improve the thermal stability of the glass, particularly the devitrification resistance of the glass in the molten state, the lower limit of the mass ratio ($B_2O_3/(B_2O_3+SiO_2)$) is preferably 0.2, more preferably 0.24, much more preferably 0.25, and still more preferably 0.3. Furthermore, in order to improve the thermal stability of the glass, particularly the devitrification resistance of the glass during reheating, the upper limit of the mass ratio ($B_2O_3/(B_2O_3+SiO_2)$) is preferably 0.99, more preferably 0.96, much more preferably 0.95, far more preferably 0.94, still more preferably 0.9, even still more preferably 0.8, and even much more preferably 0.7. Its upper limit is particularly preferably 0.6.

($TiO_2+Nb_2O_5+ZrO_2$)

$TiO_2$, $Nb_2O_5$ and $ZrO_2$ are components that function to increase the refractive index and dispersion of the glass. In order to obtain the required optical properties, the total content ($TiO_2+Nb_2O_5+ZrO_2$) of $TiO_2$, $Nb_2O_5$ and $ZrO_2$ is set to be 15% or more. Meanwhile, if the total content of $TiO_2$, $Nb_2O_5$ and $ZrO_2$ exceeds 45%, the thermal stability of the glass is deteriorated. Accordingly, the total content of $TiO_2$, $Nb_2O_5$ and $ZrO_2$ is in the range of 15 to 45%. In order to obtain the required optical properties, the lower limit of $TiO_2+Nb_2O_5+ZrO_2$ is preferably 18%, more preferably 21%, much more preferably 24%, still more preferably 25%, and even still more preferably 27%. In order to improve the thermal stability of the glass, the upper limit of $TiO_2+Nb_2O_5+ZrO_2$ is preferably 43%, more preferably 41%, much more preferably 40%, still more preferably 39%, even still more preferably 36%, and even much more preferably 34%.

($TiO_2/(TiO_2+Nb_2O_5+ZrO_2)$)

If the mass ratio ($TiO_2/(TiO_2+Nb_2O_5+ZrO_2)$) of the content of $TiO_2$ to the total content of $TiO_2+Nb_2O_5+ZrO_2$ is less than 0.01, the liquidus temperature rises up and thereby the devitrification resistance of the glass in the molten state is deteriorated. Further, if the mass ratio ($TiO_2/(TiO_2+Nb_2O_5+ZrO_2)$) exceeds 0.8, the liquidus temperature rises up, and thereby the devitrification resistance during reheating as well as the devitrification resistance of the glass in the molten state is deteriorated. Therefore, the mass ratio ($TiO_2/(TiO_2+Nb_2O_5+ZrO_2)$) is in the range of 0.01 to 0.8. In order to improve the devitrification resistance of the glass in the molten state, the lower limit of the mass ratio ($TiO_2/(TiO_2+Nb_2O_5+ZrO_2)$) is preferably 0.05, more preferably 0.09, much more preferably 0.15, far more preferably 0.25, still more preferably 0.35, and even still more preferably 0.45. Furthermore, in order to improve both the devitrification resistance of the glass in the molten state and the devitrification resistance of the glass during reheating, the upper limit of the mass ratio ($TiO_2/(TiO_2+Nb_2O_5+ZrO_2)$) is preferably 0.75, more preferably 0.7, and much more preferably 0.65.

($Nb_2O_5$, $TiO_2$)

In order to improve both the devitrification resistance of the glass in the molten state and the devitrification resistance of the glass during reheating, the content of $TiO_2$ is preferably in the range of 0.5 to 23%, and the content of $Nb_2O_5$ is preferably in the range of 2 to 38%. In order to improve the thermal stability of the glass, the lower limit of the content of $TiO_2$ is more preferably 3%, much more preferably 6%, still more preferably 9%, and even still more preferably 12%, while the upper limit of the content of $TiO_2$ is more preferably 21%, much more preferably 19%, and still more preferably 17%.

In order to improve the thermal stability of the glass, the lower limit of the content of $Nb_2O_5$ is more preferably 4%, much more preferably 6%, and still more preferably 8%, while the upper limit of the content of $Nb_2O_5$ is more preferably 34%, much more preferably 30%, far more preferably 26%, still more preferably 22%, even still more preferably 18%, and even much more preferably 17%.

(BaO)

BaO is a component that functions to improve the meltability of the glass and lower the glass transition temperature. This component is also effective to adjust optical properties. Further, it is possible to improve both the devitrification resistance of the glass in the molten state and the devitrification resistance thereof during reheating by containing a proper amount of BaO. In order to achieve these effects, the content of BaO is preferably in the range of 5 to 35%. In order to further enhance the effects, the upper limit of the content of BaO is more preferably 30%, much more preferably 27%, still more preferably 25%, and even still more preferably 22%, while the lower limit of the content of BaO is more preferably 9%, and much more preferably 11%.

($ZrO_2$)

In order to improve both the devitrification resistance of the glass in the molten state and the devitrification resistance of the glass during reheating and to improve the meltability, $ZrO_2$ is preferably in the range of 0 to 6%. In order to enhance such an effect, the lower limit of the content of $ZrO_2$ is more preferably 0.5%, much more preferably 1%, while the upper limit of the content of $ZrO_2$ is more preferably 5%, much more preferably 4%, and still more preferably 3%.

($NWM=BaO+SrO+CaO+MgO+K_2O+Na_2O+Li_2O$)

SrO, CaO, MgO, $K_2O$, $Na_2O$ and $Li_2O$ are components that function to improve the meltability of the glass together with BaO and thereby lower the glass transition temperature. These components are also effective to adjust optical properties. Further, it is possible to improve the thermal stability of the glass by containing a proper amount of the components. If the total content ($BaO+SrO+CaO+MgO+K_2O+Na_2O+Li_2O=NWM$) of BaO, SrO, CaO, MgO, $K_2O$, $Na_2O$ and $Li_2O$ is less than 12%, the above-described effect is not achieved. If the total content is more than 40%, it is difficult to obtain the required optical properties, and the thermal stability of the glass is deteriorated. Therefore, the total content of BaO, SrO, CaO, MgO, $K_2O$, $Na_2O$ and $Li_2O$ is in the range of 12 to 40%. In order to improve the meltability and thermal stability of the glass, the lower limit of the total content of BaO, SrO, CaO, MgO, $K_2O$, $Na_2O$ and $Li_2O$ is preferably 15%, more preferably 17%, and much more preferably 19%. In order to obtain the required optical properties while improving the thermal stability of the glass, the upper limit of the total content of BaO, SrO, CaO, MgO, $K_2O$, $Na_2O$ and $Li_2O$ is preferably 37%, and more preferably 33%.

($(BaO+SrO+CaO)/(BaO+SrO+CaO+MgO+K_2O+Na_2O+Li_2O)$)

If the mass ratio $((BaO+SrO+CaO)/(BaO+SrO+CaO+MgO+K2O+Na_2O+Li_2O))$ of the total content of BaO, SrO and CaO to $BaO+SrO+CaO+MgO+K_2O+Na_2O+Li_2O$ is less than 0.4, the liquidus temperature rises up, so that the devitrification resistance of the glass in the molten state as well as the devitrification resistance of the glass during reheating is deteriorated. Therefore, the mass ratio (($BaO+SrO+CaO$)/($BaO+SrO+CaO+MgO+K_2O+Na_2O+Li_2O$)) is 0.4 or more. In order to improve the thermal stability of the glass, the lower limit of the mass ratio (($BaO+SrO+CaO$)/($BaO+SrO+CaO+MgO+K_2O+Na_2O+Li_2O$)) is preferably 0.5, more preferably 0.6, and much more preferably 0.7, while the upper limit of the mass ratio is preferably 1, more preferably 0.95, much more preferably 0.9, and still more preferably 0.85.

($K_2O+Na_2O+Li_2O$)/($BaO+SrO+CaO+MgO+K_2O+Na_2O+Li_2O$))

If the mass ratio (($K_2O+Na_2O+Li_2O$)/($BaO+SrO+CaO+MgO+K_2O+Na_2O+Li_2O$)) of the total content of $K_2O$, $Na_2O$ and $Li_2O$ to the total content ($BaO+SrO+CaO+MgO+K_2O+Na_2O+Li_2O$) of BaO, SrO, CaO, MgO, $K_2O$, $Na_2O$ and $Li_2O$ is less than 0.1, the thermal stability of glass, particularly the devitrification resistance of the glass in the molten state is deteriorated, and the liquidus temperature rises up. Therefore, the mass ratio (($K_2O+Na_2O+Li_2O$)/($BaO+SrO+CaO+MgO+K_2O+Na_2O+Li_2O$)) is 0.1 or more.

If the mass ratio (($K_2O+Na_2O+Li_2O$)/($BaO+SrO+CaO+MgO+K_2O+Na_2O+Li_2O$)) is more than 0.5, the thermal stability of the glass, particularly the devitrification resistance of the glass during reheating shows a tendency to deteriorate. Thus, in order to improve the thermal stability of the glass, the mass ratio (($K_2O+Na_2O+Li_2O$)/($BaO+SrO+CaO+MgO+K_2O+Na_2O+Li_2O$)) is preferably set to be 0.5 or less.

In order to further improve the thermal stability of the glass, the lower limit of the mass ratio (($K_2O+Na_2O+Li_2O$)/($BaO+SrO+CaO+MgO+K_2O+Na_2O+Li_2O$)) is preferably 0.11, more preferably 0.12, much more preferably 0.13, far more preferably 0.14, still more preferably 0.15, and even still more preferably 0.17. The upper limit of the mass ratio is preferably 0.45, more preferably 0.4, much more preferably 0.35, still more preferably 0.3, and even still more preferably 0.28.

(ZnO, CaO)

In order to improve both the devitrification resistance of the glass in the molten state and the devitrification resistance of the glass during reheating, the content of ZnO is preferably in the range of 0 to 27%, and the content of CaO is preferably in the range of 0 to 15%.

In order to improve the thermal stability of the glass, the lower limit of the content of ZnO is more preferably 3%, much more preferably 6%, still more preferably 9%, and even still more preferably 12%. Further, in order to improve the thermal stability of the glass and obtain the required optical properties, the upper limit of the content of ZnO is preferably 27%, more preferably 25%, still more preferably 22%, and even still more preferably 19%.

In order to improve the thermal stability of the glass, the lower limit of the content of CaO is preferably 1%, more preferably 2%, much more preferably 3%, and still more preferably 4%, while the upper limit of the content of CaO is preferably 13%, more preferably 11%, and much more preferably 9%.

(SrO)

In order to improve both the devitrification resistance of the glass in the molten state and the devitrification resistance during reheating, the content of SrO is preferably in the range of 0 to 8%, more preferably 0 to 6%, much more preferably 0 to 4%, and still more preferably 0 to 2%.

(MgO)

In order to maintain the thermal stability of the glass while obtaining desired optical properties, the content of MgO is preferably in the range of 0 to 3%, more preferably 0 to 2%, much more preferably 0 to 1%, and still more preferably 0 to 0.5%. The content of MgO may be 0%.

($K_2O$)

In order to improve both the devitrification resistance of the glass in the molten state and the devitrification resistance thereof during reheating, the content of $K_2O$ is preferably in the range of 0 to 11%, the lower limit of the content of $K_2O$ is more preferably 0.5% and much more preferably 1%, and the upper limit of the content of $K_2O$ is more preferably 9%, much more preferably 7%, and still more preferably 5%.

($Na_2O$, $Li_2O$)

In order to improve both the devitrification resistance of the glass in the molten state and the devitrification resistance thereof during reheating, the content of $Na_2O$ is preferably in the range of 0 to 11%, the lower limit of the content of $Na_2O$ is more preferably 1%, much more preferably 2%, and still more preferably 3%, and the upper limit of the content of $Na_2O$ is more preferably 9%, much more preferably 7%, and still more preferably 5%. In order to improve both the devitrification resistance of the glass in the molten state and the devitrification resistance thereof during reheating, the content of $Li_2O$ is preferably in the range of 0 to 15%, more preferably 0 to 13%, much more preferably 0 to 11%, far more preferably 0 to 9%, still more preferably 0 to 7%, even still more preferably 0 to 5%, much more preferably 0 to 3%, and particularly preferably 0 to 2%.

($La_2O_3$, $Gd_2O_3$, $Y_2O_3$, $Yb_2O_3$, $Lu_2O_3$)

In addition, for the purpose of adjusting the refractive index, the total content of $La_2O_3$, $Gd_2O_3$, $Y_2O_3$, $Yb_2O_3$, and $Lu_2O_3$ may be 10% or less. However, if the total content of $La_2O_3$, $Gd_2O_3$, $Y_2O_3$, $Yb_2O_3$, and $Lu_2O_3$ exceeds 10%, the thermal stability of the glass as well as the meltability of the glass is deteriorated. In order to improve the stability and meltability of the glass, the total content of $La_2O_3$, $Gd_2O_3$, $Y_2O_3$, $Yb_2O_3$, and $Lu_2O_3$ is preferably in the range of 0 to 10%. Moreover, in order to improve the thermal stability and meltability of the glass, the total content of $La_2O_3$, $Gd_2O_3$, $Y_2O_3$, $Yb_2O_3$, and $Lu_2O_3$ is more preferably in the range of 0 to 9%, much more preferably 0 to 8%, far more preferably 0 to 7%, still more preferably 0 to 6%, even still more preferably 0 to 5%, much more preferably 0 to 4%, and particularly preferably 0 to 3%.

($Sb_2O_3$)

Further, a small amount of $Sb_2O_3$ may be added as a clarifying agent. However, if the content of $Sb_2O_3$ exceeds 0.1% as a ratio of the content of $Sb_2O_3$ to the total content other than $Sb_2O_3$, the coloring of the glass is intensified. Thus, it is preferable that the content of $Sb_2O_3$ ranges from 0 to 0.1% as a ratio of the content of $Sb_2O_3$ to the total content other than $Sb_2O_3$. $Sb_2O_3$ absorbs visible light in the glass, and causes the corrosion of platinum when the glass is melted in a melting vessel formed of platinum, so that platinum ions may be introduced into the glass and thereby the coloring of the glass may be increased. Therefore, a smaller amount of $Sb_2O_3$ is preferred. The upper limit of the content of $Sb_2O_3$ as a ratio of the content of $Sb_2O_3$ to the total content other than $Sb_2O_3$ is more preferably 0.05%, much more preferably 0.02%, and still more preferably 0.01%. The content of $Sb_2O_3$ may be 0%.

(Total Content of the Above Components)

In order to obtain the glass which has the required refractive index and Abbe's number and is excellent in thermal stability, the total content of the above components is preferably 95% or more, more preferably 96% or more, much more preferably 97% or more, far more preferably 98% or more, still more preferably 99% or more, much more preferably 99.5% or more, and particularly preferably 100%.

(Components Preferred to be Excluded)

Although Pb functions to increase the refractive index as the glass component, it is not substantially contained in the optical glass of the present invention in view of a negative effect on environment. Further, an expression 'PbO is not substantially contained' is not meant to exclude even a glass containing PbO as impurities.

It is preferable that As, Cd, Cr, Te, U and Th are not contained in view of a negative effect on environment.

Since the optical glass of the present invention has high light transmittance in a visible light region, this optical glass is suitable as a material of the optical element constituting an imaging optical system or a projection optical system. In order to reduce the coloring of the glass and maintain the high light transmittance in the visible light region, it is preferable that Cu, Eu, Er, Tb, Co, Cr, Ni, Fe, and Nd causing the coloring of the glass are not contained. F is extremely violated during the melting of the glass, thus causing the optical properties of the manufactured glass to be largely changed or causing striae to be generated. Therefore, it is preferable that F is not contained.

[Optical Properties]

The optical glass of the present invention has the refractive index nd of 1.78 to 1.84, and the Abbe's number vd of 26 to 32.

In order to realize the compactness of the optical system such as an imaging optical system or a projection optical system and high functionality including the increase in zoom ratio and so on, the refractive index nd is set to be 1.78 or more. In order to maintain the stability of the glass, the refractive index nd is set to be 1.84 or less. In order to realize the compactness and high functionality of the optical system, the lower limit of the refractive index nd is preferably 1.785, and more preferably 1.790. In order to maintain the thermal stability of the glass, the upper limit of the refractive index nd is preferably 1.835.

Further, in order to realize the compactness and high functionality of the optical system, it is preferable that the refractive index nd and the Abbe's number vd satisfy the following equation (1) when the Abbe's number vd is in a range of 27.5 or less.

$$nd > 2.22 - 0.016 \lambda vd \quad (1)$$

[Coloring of Glass]

Since the optical glass of the present invention has high light transmittance in the visible light region, the coloring of the glass is little. A coloring degree of the glass is quantitatively expressed by $\lambda 80$, $\lambda 70$, $\lambda 5$ or the like.

A glass sample 10.0 mm in thickness having parallel, optically polished surfaces is used. Light rays of an intensity Iin are directed perpendicularly onto one of the optically polished surfaces, and the intensity Iout of light rays passing through the sample is measured. An intensity ratio Iout/Iin is referred to as external transmittance. In a wavelength range of 280 to 700 nm, a wavelength at which the external transmittance is 80% is adopted as $\lambda 80$, a wavelength at which the external transmittance is 70% is adopted as $\lambda 70$, and a wavelength at which the external transmittance is 5% is adopted as $\lambda 5$. In the glass having the thickness of 10.0 mm, the external transmittance in the wavelength range of $\lambda 80$ to 700 nm is 80% or more, the external transmittance in the wavelength range of $\lambda 70$ to 700 nm is 70% or more, and the external transmittance in the wavelength range of $\lambda 5$ to 700 nm is 5% or more.

According to a preferred exemplary embodiment, $\lambda 80$ is 480 nm or less, $\lambda 70$ is 430 nm or less, and $\lambda 5$ is 390 nm or less.

[Partial Dispersion Ratio]

A partial dispersion ratio Pg, F is defined as the follow equation.

$$Pg,F=(ng-nF)/(nF-nC)$$

In the present invention, the partial dispersion ratio Pg, F is, for example, in the range of 0.58 to 0.63 and is suitable as an optical element material for correcting chromatic aberration.

[Specific Gravity]

In the present invention, a specific gravity is, for example, 3.90 or less.

[Melting of Glass]

In order to further reduce the coloring of the glass, it is preferable that a batch raw material (non-vitrifaction raw material) is rough melted using a non-metallic vessel to prepare a cullet and the cullet is melted using a platinum or platinum alloy vessel to mold an obtained homogeneous glass melt (molten glass). In a process of obtaining the glass from the batch raw material, the corrosivity of a melt is most intensified when the batch raw material is subjected to a vitrification reaction. Even if non-metal is introduced into the melt when the rough melting is performed using the non-metallic vessel, it does not cause the strong coloring of the glass, unlike platinum ions or the like. Silica is preferred as a material of the non-metallic vessel. Even if the silica is dissolved in the melt, there is no problem where the glass is colored or impurities are introduced, because the silica is a substance common with the glass component.

Further, according to the present invention, it is possible to lower a melting temperature because the devitrification resistance in molten state is excellent and the liquidus temperature is low. As a result, it is possible to reduce a corrosion rate of the material of the vessel for rough melting formed of non-metal, such as slica, thus allowing an introduced amount of silica into the glass to be reduced. Consequently, a deviation amount of the optical properties due to the introduction of the silica may be reduced. By reducing the deviation amount of the optical properties, for instance, the refractive index, the amount of $SiO_2$ is decreased during the blending of raw materials, thus making it easy to perform the optical-properties correction for cancelling the deviation amount.

A known method may be applied as a method of producing the optical glass by melting the cullet. For example, after the cullet is put into a crucible made of a platinum or platinum alloy, the cullet is heated and melted, so that the molten glass is obtained. Then, a temperature is raised to clarify the molten glass, and foam is removed from the molten glass. Subsequently, after the temperature is lowered, the molten glass is stirred and homogenized. The molten glass is poured out from the crucible and cast into a mold to be molded.

In addition to decreasing the deformation of a resulting glass molded article by gradual cooling, the refractive index of the glass is finely adjusted if necessary.

[Glass Material for Press Molding]

The glass material for press molding of the present invention is comprised of the above-described optical glass. A known method may also be used as a method of manufacturing the glass material for press molding.

[Optical Element]

The optical element of the present invention is comprised of the above-described optical glass. Examples of the optical element may include a variety of lenses, such as a spherical lens, an aspherical lens, a lens array, or a micro lens, a diffraction grating, a prism or the like. An optical multilayered film such as an anti-reflection film may be formed on a surface of the optical element, if necessary.

Examples of the method of manufacturing the optical element include a method where the glass material for press molding is heated and press-molded to produce a glass molded article and then this glass molded article is polished, thus manufacturing the optical element, a method where the above-described optical glass is ground and polished, thus manufacturing the optical element, or the like.

The press molding of the glass material for press molding is performed as follows: for example, the glass material for press molding is heated to a temperature at which the viscosity of the glass reaches $10^4$ to $10^6$ dPa·s, and then is press-molded by a mold. The glass material for press molding may be heated, softened, and press-molded in the atmosphere. This method (hereinafter, referred to as the reheat press method) is performed at a viscosity lower than the viscosity of the glass when the precision press molding is performed. The precision press molding method forms the optical functional surface of the optical element by the press molding, while the reheat press method forms an general shape of the optical element by the press molding, and forms the optical functional surface of the optical element by machining including the polishing.

In comparison with the precision press molding method, the reheat press method performs the press molding at a higher temperature. Hence, the temperature of the glass during the press molding reaches a crystallization temperature range, thus increasing a risk that devitrification occurs during reheating. Since the optical glass of the present invention is excellent in devitrification resistance during reheating, it is possible to obtain a homogeneous glass molded article by the reheat press method.

By the press molding, the glass material is molded into a molded article having a shape similar to a targeted shape of the optical element. This molded article is called an optical element blank. In addition to decreasing the internal deformation of the optical element blank by gradual cooling, the refractive index of the glass is finely adjusted. Thereafter, the optical element blank may be grounded and polished to be finished in the form of an optical element requiring high shape accuracy, such as a lens, for example.

Since the optical element of the present invention is made of glass having excellent thermal stability, devitrification does not occur even if the glass is heated and softened as described above.

EXAMPLE

Although examples of the present invention will be described below for illustrative purpose, the present invention is not limited to the following examples.

Example 1

Manufacture of Optical Glass and Evaluation of Several Properties Thereof

As the raw materials for introducing respective components to have glass compositions Nos. 1 to 39 shown in table 1, phosphate, fluoride, oxide and the like corresponding to the respective raw materials were used and the raw materials were weighed. They were sufficiently mixed to prepare a blended raw material (batch raw material). This blended raw material was put into the silica crucible and then was heated and rough melted at 1150° C. for 30 minutes to 1 hour. The resulting molten substance was quenched to be vitrified, and was pulverized so that the cullet was obtained.

Next, the cullet was put into a platinum crucible, and was heated and melted at 1100° C. for 1 to 2 hours, thus preparing the molten glass. This molten glass was clarified, homogenized, and poured from the crucible into the mold, thus molding the homogeneous optical glass.

The composition and properties of each obtained optical glass were analyzed and measured as follows. The compositions were shown in table 2, and various properties were shown in table 3.

(1) Glass Composition

The content of each component was measured by an inductively coupled plasma atomic emission method (ICP-AES method), and an ion chromatography method, if necessary.

(2) Refractive Index nd, Abbe's Number νd

They were measured for the optical glass cooled at the cooling rate of 30° C. per 1 hour.

(3) Crystallization Peak Temperature Tx

The glass sufficiently pulverized in the mortar was used as the sample. The crystallization peak temperature was determined based on the differential scanning calorimetry curve (DSC curve) that was obtained for this sample using the high temperature differential scanning calorimeter. An intersection of a baseline of the DSC curve and a tangent line at a point where a gradient is maximum when the exothermic peak appears from the baseline in the differential scanning calorimetry curve (DSC curve) was defined as the crystallization peak temperature (Tx).

(4) Glass Transition Temperature Tg

The glass transition temperature was measured under the condition of a heating rate of 10° C./min using a thermo-mechanical analyzer.

(5) Liquidus Temperature LT

About 5 cc of glass cooled to a room temperature was put into the platinum crucible. The crucible was placed in a furnace, the internal temperature of which was uniformized at a predetermined temperature. The set temperature of the furnace was adapted to the predetermined temperature and then maintained for 2 hours. Subsequently, the crucible was taken out from the furnace, and the crystallization of the glass and the change in quality were observed. While the set temperature in the furnace was changed by 5° C., the above-described operation was repeatedly performed. Thereby, a lowest set temperature at which the crystallization and the change in quality were not observed was established as the liquidus temperature. The crystallization and the change in quality were checked by magnifying the glass to 100 times and then observing it using an optical microscope. In this context, the ⌜change in quality⌝ means that foreign matters (micro crystals or the like) occur in the glass.

(6) Coloring Degree λ80, λ70 and λ5

The spectral transmittance of the glass sample having the thickness of 10.0 mm was measured in the wavelength range of 280 to 700 nm. The wavelength at which the external transmittance was 80% was adopted as λ80, the wavelength at which the external transmittance was 70% was adopted as λ70, and the wavelength at which the external transmittance was 5% was adopted as λ5.

(7) Partial Dispersion Ratio

The refractive indexes nC, nF and ng for the optical glass cooled at the cooling rate of 30° C. per one hour were measured, and the partial dispersion ratio was calculated based on the measured result.

(8) Specific Gravity

It was measured by the Archimedes method.

In the obtained optical glass, a melting residue of the raw material, the precipitation of a crystal, foam, and striae were not observed.

Although the rough melting of the batch raw material was performed in the silica crucible, a silica tube may be used in place of the silica crucible. The silica tube is obliquely arranged in the furnace, the batch raw material is introduced from an opening at the higher position side into the silica tube, and the molten batch raw material becomes a molten substance, flows in the silica tube, and drops from an opening at the lower position side. The molten substance is received in water held in a water tank located thereunder to be quenched, and the solidified cullet is taken out from the water and dried. Thereafter, it may be melted in the platinum crucible.

Example 2

Manufacture of Optical Element

Various optical glasses manufactured in Example 1 were cut into a plurality of glass pieces. These glass pieces were barrel-polished to prepare a plurality of glass materials for press molding. The surfaces of the glass materials for press molding were roughened by the barrel-polishing.

Next, boron nitride powder was applied to the roughened surface of the glass material for press molding, and then was put into a heating furnace. The glass material for press molding was heated to a temperature at which the viscosity of the glass reaches $10^4$ to $10^6$ dPa·s, and then was introduced into the mold to be press molded. A lens blank having the shape similar to the shape of a lens was made by the press molding.

The lens blank was put into an annealing furnace called a lehr to be gradually cooled and thereby to decrease deformation, and subsequently was ground and polished in a known manner, so that a spherical lens was obtained.

The optical element was thus made of the various optical glasses manufactured in example 1. The precipitation of a crystal, striae, and foam were not observed in all the obtained optical elements.

Comparative Example 1

Manufacture of Optical Glass and Evaluation of Several Properties Thereof

A glass composition (table 1, composition A) described in example 1 of Patent Document 1 was prepared by the method described in Patent Document 1, and the composition and properties of each obtained optical glass were analyzed and measured in the same manner as Example 1. The results are shown in table 3. The glass composition A has the mass ratio $((K_2O+Na_2O+Li_2O)/(BaO+SrO+CaO+K_2O+Na_2O+Li_2O))$ of 0.07 which is less than 0.1, and a high liquidus temperature of 1140° C.

Comparative Example 2

Manufacture of Optical Glass and Evaluation of Several Properties Thereof

A glass composition (table 1, composition B) described in example 10 of Patent Document 3 was prepared by the method described in Patent Document 3, and the composition and properties of each obtained optical glass were analyzed and measured in the same manner as Example 1. The results are shown in table 3. The crystallization peak temperature Tx was 605° C., the glass transition temperature Tg was 526° C., and $\Delta T$ was 79° C. Further, the mass ratio $(B_2O_3/(B_2O_3 \pm SiO_2))$ of the glass composition B was 0.137 which is less than 0.15.

The glass composition B is a glass for precision press molding, is low in glass transition temperature, and is desirable for the precision press molding. However, when it was heated to a higher temperature at which the viscosity of the glass reaches $10^4$ to $10^6$ dPa·s than a temperature for the precision press molding, the crystals precipitated out in the glass.

[Table 1]

TABLE 1

| composition No. | component (mass %) | | | | | | | | | | | | | | |
|---|---|---|---|---|---|---|---|---|---|---|---|---|---|---|---|
| | $B_2O_3$ | $SiO_2$ | $TiO_2$ | $Nb_2O_5$ | $ZrO_2$ | BaO | SrO | CaO | $K_2O$ | $Na_2O$ | $Li_2O$ | ZnO | $La_2O_3$ | $Y_2O_3$ | total |
| 1 | 10.0 | 20.4 | 5.6 | 28.4 | 1.7 | 5.5 | 0.0 | 3.8 | 0.9 | 3.7 | 2.0 | 13.1 | 4.9 | 0.0 | 100 |
| 2 | 14.6 | 15.1 | 3.4 | 31.2 | 1.7 | 8.5 | 0.0 | 0.0 | 1.2 | 3.7 | 1.9 | 13.1 | 5.6 | 0.0 | 100 |
| 3 | 7.4 | 20.8 | 15.0 | 14.3 | 1.7 | 10.2 | 0.0 | 4.5 | 1.9 | 3.9 | 0.2 | 14.6 | 5.5 | 0.0 | 100 |
| 4 | 7.4 | 20.7 | 15.0 | 14.2 | 1.7 | 15.4 | 0.0 | 5.2 | 1.9 | 3.9 | 0.0 | 14.6 | 0.0 | 0.0 | 100 |
| 5 | 9.2 | 18.0 | 15.2 | 14.3 | 1.7 | 15.6 | 0.0 | 5.3 | 1.9 | 4.0 | 0.0 | 14.8 | 0.0 | 0.0 | 100 |
| 6 | 7.3 | 19.4 | 14.9 | 14.2 | 1.7 | 15.3 | 0.0 | 5.2 | 1.8 | 3.9 | 0.0 | 16.3 | 0.0 | 0.0 | 100 |
| 7 | 6.3 | 20.5 | 14.8 | 14.0 | 1.7 | 15.2 | 0.0 | 5.1 | 1.8 | 3.9 | 0.0 | 16.7 | 0.0 | 0.0 | 100 |
| 8 | 7.5 | 18.0 | 15.2 | 14.5 | 1.7 | 15.6 | 0.0 | 5.3 | 1.9 | 5.5 | 0.0 | 14.8 | 0.0 | 0.0 | 100 |
| 9 | 7.4 | 17.9 | 15.1 | 14.3 | 1.7 | 15.5 | 0.0 | 5.2 | 4.2 | 4.0 | 0.0 | 14.7 | 0.0 | 0.0 | 100 |
| 10 | 7.4 | 17.8 | 15.0 | 14.3 | 1.7 | 15.4 | 0.0 | 8.0 | 1.9 | 3.9 | 0.0 | 14.6 | 0.0 | 0.0 | 100 |
| 11 | 7.0 | 17.0 | 14.3 | 13.6 | 1.6 | 21.9 | 0.0 | 5.0 | 1.8 | 3.8 | 0.0 | 14.0 | 0.0 | 0.0 | 100 |
| 12 | 9.3 | 18.2 | 14.2 | 14.5 | 1.8 | 15.8 | 0.0 | 5.3 | 1.9 | 4.0 | 0.0 | 15.0 | 0.0 | 0.0 | 100 |
| 13 | 9.4 | 18.4 | 15.5 | 12.5 | 1.6 | 15.9 | 0.0 | 5.4 | 1.9 | 4.1 | 0.0 | 15.1 | 0.0 | 0.0 | 100 |
| 14 | 9.4 | 18.4 | 15.5 | 14.7 | 1.8 | 16.0 | 0.0 | 5.4 | 1.9 | 4.1 | 0.0 | 12.8 | 0.0 | 0.0 | 100 |
| 15 | 9.6 | 18.9 | 15.9 | 15.0 | 1.8 | 16.4 | 0.0 | 5.5 | 2.0 | 4.2 | 0.0 | 10.7 | 0.0 | 0.0 | 100 |
| 16 | 12.1 | 14.3 | 15.7 | 12.9 | 1.8 | 16.2 | 0.0 | 5.5 | 2.0 | 4.1 | 0.0 | 15.4 | 0.0 | 0.0 | 100 |
| 17 | 15.3 | 10.2 | 16.4 | 11.5 | 1.9 | 16.7 | 0.0 | 5.7 | 2.0 | 4.3 | 0.0 | 16.0 | 0.0 | 0.0 | 100 |
| 18 | 18.7 | 5.8 | 17.0 | 9.8 | 2.0 | 17.6 | 0.0 | 5.9 | 2.1 | 4.5 | 0.0 | 16.6 | 0.0 | 0.0 | 100 |
| 19 | 22.4 | 1.1 | 17.7 | 8.0 | 2.0 | 18.3 | 0.0 | 6.2 | 2.2 | 4.7 | 0.0 | 17.4 | 0.0 | 0.0 | 100 |
| 20 | 10.6 | 16.1 | 15.4 | 13.7 | 1.8 | 15.9 | 0.0 | 5.4 | 1.9 | 4.1 | 0.0 | 15.1 | 0.0 | 0.0 | 100 |
| 21 | 9.5 | 16.0 | 15.7 | 13.9 | 1.8 | 16.3 | 0.0 | 5.5 | 1.9 | 4.1 | 0.0 | 15.3 | 0.0 | 0.0 | 100 |
| 22 | 9.9 | 13.9 | 16.3 | 13.4 | 1.9 | 16.7 | 0.0 | 5.7 | 2.0 | 4.3 | 0.0 | 15.9 | 0.0 | 0.0 | 100 |
| 23 | 10.7 | 9.0 | 17.6 | 12.3 | 2.0 | 18.3 | 0.0 | 6.1 | 2.2 | 4.6 | 0.0 | 17.2 | 0.0 | 0.0 | 100 |
| 24 | 12.5 | 14.7 | 16.1 | 13.4 | 1.9 | 12.0 | 0.0 | 7.3 | 2.0 | 4.3 | 0.0 | 15.8 | 0.0 | 0.0 | 100 |
| 25 | 12.4 | 14.6 | 16.0 | 13.3 | 1.9 | 11.9 | 0.0 | 5.6 | 2.0 | 4.2 | 0.0 | 18.1 | 0.0 | 0.0 | 100 |
| 26 | 11.8 | 13.9 | 15.3 | 12.6 | 1.8 | 20.1 | 0.0 | 3.7 | 1.9 | 4.0 | 0.0 | 14.9 | 0.0 | 0.0 | 100 |
| 27 | 11.9 | 14.0 | 15.3 | 12.7 | 1.8 | 20.2 | 0.0 | 5.4 | 1.9 | 4.1 | 0.0 | 12.7 | 0.0 | 0.0 | 100 |
| 28 | 12.4 | 14.6 | 16.0 | 13.3 | 1.9 | 13.1 | 0.0 | 6.9 | 2.0 | 4.2 | 0.0 | 15.6 | 0.0 | 0.0 | 100 |
| 29 | 12.3 | 14.5 | 16.0 | 13.2 | 1.8 | 14.1 | 0.0 | 6.4 | 2.0 | 4.2 | 0.0 | 15.5 | 0.0 | 0.0 | 100 |
| 30 | 12.4 | 14.6 | 16.1 | 13.3 | 1.9 | 12.0 | 0.8 | 6.9 | 2.0 | 4.3 | 0.0 | 15.7 | 0.0 | 0.0 | 100 |
| 31 | 12.4 | 14.6 | 16.1 | 13.3 | 1.9 | 11.9 | 1.6 | 6.4 | 2.0 | 4.2 | 0.0 | 15.6 | 0.0 | 0.0 | 100 |
| 32 | 14.1 | 14.7 | 17.4 | 15.4 | 1.9 | 14.4 | 0.0 | 7.4 | 2.0 | 4.3 | 0.0 | 8.4 | 0.0 | 0.0 | 100 |
| 33 | 16.0 | 15.0 | 19.9 | 17.7 | 1.9 | 14.6 | 0.0 | 8.4 | 2.1 | 4.4 | 0.0 | 0.0 | 0.0 | 0.0 | 100 |
| 34 | 12.7 | 15.0 | 16.5 | 13.6 | 0.0 | 12.3 | 0.0 | 7.5 | 2.0 | 4.3 | 0.0 | 16.1 | 0.0 | 0.0 | 100 |
| 35 | 13.5 | 14.8 | 16.2 | 13.4 | 1.9 | 12.1 | 0.0 | 7.4 | 0.0 | 4.8 | 0.0 | 15.9 | 0.0 | 0.0 | 100 |

TABLE 1-continued

| composition No. | component (mass %) | | | | | | | | | | | | | | |
|---|---|---|---|---|---|---|---|---|---|---|---|---|---|---|---|
| | B₂O₃ | SiO₂ | TiO₂ | Nb₂O₅ | ZrO₂ | BaO | SrO | CaO | K₂O | Na₂O | Li₂O | ZnO | La₂O₃ | Y₂O₃ | total |
| 36 | 13.5 | 14.7 | 16.2 | 13.3 | 1.9 | 12.0 | 0.0 | 7.3 | 2.7 | 2.4 | 0.2 | 15.8 | 0.0 | 0.0 | 100 |
| 37 | 14.5 | 15.5 | 16.0 | 13.3 | 1.9 | 11.9 | 0.0 | 7.3 | 3.5 | 0.0 | 0.5 | 15.6 | 0.0 | 0.0 | 100 |
| 38 | 12.8 | 14.4 | 16.0 | 13.2 | 1.8 | 14.1 | 1.6 | 3.9 | 2.0 | 4.7 | 0.0 | 15.5 | 0.0 | 0.0 | 100 |
| 39 | 13.0 | 14.2 | 15.6 | 12.9 | 1.8 | 16.8 | 3.5 | 0.0 | 1.9 | 5.0 | 0.0 | 15.3 | 0.0 | 0.0 | 100 |
| A(comparative example1) | 10.0 | 11.0 | 15.0 | 10.0 | 5.0 | 30.0 | 0.0 | 3.0 | 0.0 | 2.5 | 0.0 | 12.0 | 0.5 | 1.0 | 100 |
| B(comparative example2) | 4.2 | 26.4 | 15.0 | 15.5 | 2.0 | 11.3 | 1.0 | 8.0 | 0.0 | 0.0 | 7.0 | 6.3 | 3.3 | 0.0 | 100 |

TABLE 2

| composition No. | component (mass %) | | | | | | |
|---|---|---|---|---|---|---|---|
| | B₂O₃ + SiO₂ | B₂O₃/(B₂O₃ + SiO₂) | TiO₂ + Nb₂O₅ + ZrO₂ | NWM* | TiO₂/(TiO₂ + Nb₂O₅ + ZrO₂) | (BaO + SrO + CaO)/NWM | (K₂O + Na₂O + Li₂O)/NWM |
| 1 | 30.4 | 0.33 | 35.7 | 15.9 | 0.16 | 0.58 | 0.42 |
| 2 | 29.0 | 0.50 | 35.7 | 15.3 | 0.10 | 0.56 | 0.44 |
| 3 | 28.2 | 0.26 | 30.9 | 20.7 | 0.49 | 0.71 | 0.29 |
| 4 | 28.1 | 0.26 | 30.9 | 26.4 | 0.49 | 0.78 | 0.22 |
| 5 | 27.2 | 0.34 | 31.3 | 26.8 | 0.49 | 0.78 | 0.22 |
| 6 | 26.7 | 0.27 | 30.8 | 26.2 | 0.49 | 0.78 | 0.22 |
| 7 | 26.8 | 0.24 | 30.5 | 26.0 | 0.49 | 0.78 | 0.22 |
| 8 | 25.5 | 0.29 | 31.3 | 28.3 | 0.49 | 0.74 | 0.26 |
| 9 | 25.3 | 0.29 | 31.1 | 28.9 | 0.49 | 0.72 | 0.28 |
| 10 | 25.2 | 0.29 | 30.9 | 29.2 | 0.49 | 0.80 | 0.20 |
| 11 | 24.0 | 0.29 | 29.5 | 32.5 | 0.48 | 0.83 | 0.17 |
| 12 | 27.5 | 0.34 | 30.6 | 27.0 | 0.46 | 0.78 | 0.22 |
| 13 | 27.8 | 0.34 | 30.0 | 27.3 | 0.52 | 0.78 | 0.22 |
| 14 | 27.8 | 0.34 | 32.0 | 27.4 | 0.48 | 0.78 | 0.22 |
| 15 | 28.5 | 0.34 | 32.8 | 28.1 | 0.48 | 0.78 | 0.22 |
| 16 | 26.4 | 0.46 | 30.5 | 27.8 | 0.51 | 0.78 | 0.22 |
| 17 | 25.5 | 0.60 | 29.8 | 28.7 | 0.55 | 0.78 | 0.22 |
| 18 | 24.5 | 0.76 | 28.8 | 30.1 | 0.59 | 0.78 | 0.22 |
| 19 | 23.5 | 0.95 | 27.8 | 31.4 | 0.64 | 0.78 | 0.22 |
| 20 | 26.8 | 0.40 | 30.9 | 27.3 | 0.50 | 0.78 | 0.22 |
| 21 | 25.5 | 0.37 | 31.4 | 27.8 | 0.50 | 0.78 | 0.22 |
| 22 | 23.8 | 0.42 | 31.6 | 28.7 | 0.52 | 0.78 | 0.22 |
| 23 | 19.7 | 0.54 | 31.9 | 31.2 | 0.55 | 0.78 | 0.22 |
| 24 | 27.2 | 0.46 | 31.5 | 25.6 | 0.51 | 0.75 | 0.25 |
| 25 | 27.0 | 0.46 | 31.3 | 23.7 | 0.51 | 0.74 | 0.26 |
| 26 | 25.7 | 0.46 | 29.7 | 29.7 | 0.52 | 0.80 | 0.20 |
| 27 | 25.9 | 0.46 | 29.9 | 31.6 | 0.51 | 0.81 | 0.19 |
| 28 | 27.0 | 0.46 | 31.3 | 26.2 | 0.51 | 0.76 | 0.24 |
| 29 | 26.8 | 0.46 | 31.0 | 26.7 | 0.52 | 0.77 | 0.23 |
| 30 | 27.0 | 0.46 | 31.3 | 26.0 | 0.51 | 0.76 | 0.24 |
| 31 | 27.0 | 0.46 | 31.3 | 26.1 | 0.51 | 0.76 | 0.24 |
| 32 | 28.8 | 0.49 | 34.8 | 28.1 | 0.50 | 0.78 | 0.22 |
| 33 | 31.0 | 0.52 | 39.7 | 29.5 | 0.50 | 0.78 | 0.22 |
| 34 | 27.7 | 0.46 | 30.1 | 26.1 | 0.55 | 0.76 | 0.24 |
| 35 | 28.3 | 0.48 | 31.6 | 24.3 | 0.51 | 0.80 | 0.20 |
| 36 | 28.2 | 0.48 | 31.4 | 24.6 | 0.52 | 0.78 | 0.22 |
| 37 | 30.0 | 0.48 | 31.3 | 23.2 | 0.51 | 0.83 | 0.17 |
| 38 | 27.3 | 0.47 | 31.0 | 26.3 | 0.52 | 0.75 | 0.25 |
| 39 | 27.2 | 0.48 | 30.3 | 27.2 | 0.51 | 0.75 | 0.25 |
| A(comparative example1) | 21.0 | 0.48 | 30.0 | 35.5 | 0.50 | 0.93 | 0.07 |
| B(comparative example2) | 30.6 | 0.14 | 32.5 | 27.3 | 0.46 | 0.74 | 0.26 |

*NWM = BaO + SrO + CaO + MgO + K₂O + Na₂O + Li₂O

TABLE 3

| composition No. | nd | νd | Tg (° C.) | Tx (° C.) | ΔT (° C.) | LT (° C.) | λ80 (nm) | λ70 (nm) | λ5 (nm) | specific gravity | Pg, F | nC | nF | ng |
|---|---|---|---|---|---|---|---|---|---|---|---|---|---|---|
| 1 | 1.80019 | 30.03 | 519 | 661 | 142 | 1100 | 441 | 396 | 356 | 3.68 | 0.599 | 1.79246 | 1.81911 | 1.83508 |
| 2 | 1.80152 | 29.74 | 498 | 644 | 146 | 1080 | 452 | 399 | 355 | 3.73 | 0.600 | 1.79370 | 1.82065 | 1.83683 |
| 3 | 1.80899 | 28.83 | 559 | 745 | 186 | 1100 | 457 | 408 | 362 | 3.70 | 0.605 | 1.80088 | 1.82894 | 1.84593 |
| 4 | 1.80103 | 28.97 | 563 | 765 | 202 | 1080 | 454 | 407 | 362 | 3.68 | 0.606 | 1.79305 | 1.82070 | 1.83745 |
| 5 | 1.80647 | 28.78 | 556 | 759 | 203 | 1060 | 460 | 409 | 362 | 3.70 | 0.608 | 1.79840 | 1.82642 | 1.84345 |

TABLE 3-continued

| composition No. | nd | vd | Tg (° C.) | Tx (° C.) | ΔT (° C.) | LT (° C.) | λ80 (nm) | λ70 (nm) | λ5 (nm) | specific gravity | Pg, F | nC | nF | ng |
|---|---|---|---|---|---|---|---|---|---|---|---|---|---|---|
| 6 | 1.80379 | 28.84 | 561 | 718 | 157 | 1080 | 458 | 408 | 362 | 3.73 | 0.605 | 1.79575 | 1.82362 | 1.84048 |
| 7 | 1.80592 | 28.95 | 567 | 748 | 181 | 1080 | 456 | 407 | 361 | 3.73 | 0.606 | 1.79788 | 1.82572 | 1.84260 |
| 8 | 1.80287 | 28.82 | 547 | 720 | 173 | 1070 | 447 | 407 | 359 | 3.70 | 0.606 | 1.79483 | 1.82269 | 1.83956 |
| 9 | 1.79569 | 29.04 | 541 | 684 | 143 | 1070 | 447 | 408 | 358 | 3.67 | 0.605 | 1.78779 | 1.81519 | 1.83178 |
| 10 | 1.81017 | 29.12 | 560 | 716 | 156 | 1070 | 446 | 405 | 358 | 3.72 | 0.603 | 1.80214 | 1.82996 | 1.84674 |
| 11 | 1.8108 | 29.26 | 554 | 692 | 138 | 1090 | 451 | 409 | 358 | 3.84 | 0.604 | 1.80281 | 1.83052 | 1.84726 |
| 12 | 1.79896 | 29.27 | 553 | 776 | 223 | 1070 | 441 | 401 | 359 | 3.69 | 0.603 | 1.79104 | 1.81834 | 1.83481 |
| 13 | 1.79862 | 29.14 | 553 | 722 | 169 | 1050 | 442 | 400 | 359 | 3.67 | 0.603 | 1.79073 | 1.81814 | 1.83467 |
| 14 | 1.80507 | 28.58 | 557 | 732 | 175 | 1070 | 440 | 398 | 360 | 3.66 | 0.604 | 1.79696 | 1.82513 | 1.84214 |
| 15 | 1.80432 | 28.53 | 563 | 744 | 181 | 1080 | 437 | 398 | 361 | 3.63 | 0.610 | 1.79615 | 1.82434 | 1.84154 |
| 16 | 1.80519 | 28.90 | 536 | 695 | 159 | 1050 | 434 | 398 | 359 | 3.69 | 0.607 | 1.79716 | 1.82502 | 1.84193 |
| 17 | 1.80402 | 29.04 | 520 | 674 | 154 | 1040 | 444 | 402 | 359 | 3.68 | 0.609 | 1.79604 | 1.82373 | 1.84059 |
| 18 | 1.80197 | 29.01 | 508 | 642 | 134 | 1020 | 447 | 405 | 358 | 3.67 | 0.604 | 1.79397 | 1.82161 | 1.83831 |
| 19 | 1.79882 | 29.10 | 487 | 584 | 97 | 1010 | 447 | 407 | 357 | 3.66 | 0.605 | 1.79091 | 1.81836 | 1.83497 |
| 20 | 1.80555 | 28.76 | 544 | 723 | 179 | 1060 | 433 | 397 | 359 | 3.69 | 0.602 | 1.79748 | 1.82549 | 1.84236 |
| 21 | 1.81239 | 28.52 | 546 | 725 | 179 | 1070 | 440 | 403 | 360 | 3.72 | 0.608 | 1.80416 | 1.83264 | 1.84995 |
| 22 | 1.81899 | 28.26 | 533 | 667 | 134 | 1070 | 447 | 405 | 359 | 3.75 | 0.608 | 1.81062 | 1.83960 | 1.85722 |
| 23 | 1.83199 | 27.71 | 507 | 635 | 128 | 1080 | 459 | 409 | 357 | 3.82 | 0.607 | 1.82335 | 1.85338 | 1.87162 |
| 24 | 1.80458 | 28.82 | 538 | 708 | 170 | 1020 | 436 | 396 | 360 | 3.62 | 0.608 | 1.79650 | 1.82442 | 1.84139 |
| 25 | 1.80613 | 28.54 | 533 | 672 | 139 | 1030 | 442 | 396 | 361 | 3.65 | 0.607 | 1.79795 | 1.82620 | 1.84336 |
| 26 | 1.80551 | 28.94 | 534 | 712 | 178 | 1070 | 444 | 400 | 360 | 3.76 | 0.604 | 1.79746 | 1.82529 | 1.84211 |
| 27 | 1.80336 | 29.24 | 540 | 706 | 166 | 1060 | 444 | 400 | 359 | 3.73 | 0.605 | 1.79541 | 1.82288 | 1.83949 |
| 28 | 1.80533 | 28.76 | 535 | 697 | 162 | 1030 | 436 | 397 | 359 | 3.62 | 0.604 | 1.79726 | 1.82526 | 1.84217 |
| 29 | 1.80505 | 28.80 | 532 | 695 | 163 | 1040 | 429 | 394 | 358 | 3.65 | 0.607 | 1.79693 | 1.82488 | 1.84184 |
| 30 | 1.80478 | 28.81 | 538 | 714 | 176 | 1020 | 433 | 395 | 359 | 3.76 | 0.608 | 1.79671 | 1.82464 | 1.84162 |
| 31 | 1.80467 | 28.80 | 539 | 710 | 171 | 1020 | 431 | 395 | 359 | 3.73 | 0.606 | 1.79660 | 1.82454 | 1.84147 |
| 32 | 1.8104 | 27.93 | 551 | 693 | 142 | 1070 | 448 | 402 | 362 | 3.55 | 0.608 | 1.80205 | 1.83107 | 1.84871 |
| 33 | 1.82005 | 26.63 | 580 | 719 | 139 | 1070 | 457 | 409 | 366 | 3.43 | 0.616 | 1.81122 | 1.84202 | 1.86099 |
| 34 | 1.80027 | 28.84 | 539 | 652 | 113 | 1030 | 439 | 399 | 359 | 3.60 | 0.609 | 1.79226 | 1.82001 | 1.83691 |
| 35 | 1.81097 | 28.76 | 550 | 689 | 139 | 1050 | 447 | 400 | 361 | 3.64 | 0.609 | 1.80280 | 1.83100 | 1.84816 |
| 36 | 1.80692 | 28.84 | 542 | 673 | 131 | 1060 | 460 | 403 | 362 | 3.61 | 0.608 | 1.79883 | 1.82681 | 1.84382 |
| 37 | 1.80556 | 28.91 | 556 | 708 | 152 | 1100 | 464 | 406 | 364 | 3.59 | 0.607 | 1.79753 | 1.82539 | 1.84230 |
| 38 | 1.80113 | 28.61 | 534 | 717 | 183 | 1050 | 451 | 404 | 361 | 3.65 | 0.605 | 1.79306 | 1.82106 | 1.83801 |
| 39 | 1.79752 | 28.61 | 526 | 671 | 145 | 1080 | 452 | 404 | 362 | 3.71 | 0.612 | 1.78949 | 1.81737 | 1.83443 |
| A (comparative example 1) | 1.79875 | 30.82 | 534 | 663 | 129 | 1140 | 438 | 393 | 354 | 3.39 | 0.602 | 1.79120 | 1.81712 | 1.83272 |
| B (comparative example 2) | 1.80276 | 30.89 | 526 | 605 | 79 | 1000 | 446 | 393 | 354 | 3.51 | 0.597 | 1.79521 | 1.82120 | 1.83672 |

What is claimed is:

1. An optical glass comprising:
   in mass %,
   15 to 37% of $B_2O_3$ and $SiO_2$ in total,
   15 to 45% of $TiO_2$, $Nb_2O_5$ and $ZrO_2$ in total, and
   12 to 40% of BaO, SrO, CaO, MgO, $K_2O$, $Na_2O$ and $Li_2O$ in total,
   0 to 3%© of $Li_2O$, and
   0% of $La_2O_3$, $Gd_2O_3$, $Y_2O_3$, $Yb_2O_3$ and $Lu_2O_3$ in total,
   wherein the optical glass has:
   a mass ratio ($B_2O_3/(B_2O_3+SiO_2)$) of 0.15 or more,
   a mass ratio ($TiO_2/(TiO_2+Nb_2O_5+ZrO_2)$) of 0.01 to 0.8,
   a mass ratio (($BaO+SrO+CaO$)/($BaO+SrO+CaO+MgO+K_2O+Na_2O+Li_2O$)) of 0.4 or more, and
   a mass ratio (($K_2O+Na_2O+Li_2O$)/($BaO+SrO+CaO+MgO+K_2O+Na_2O\pm Li_2O$)) of 0.1 or more,
   the optical glass substantially contains no PbO, and
   the optical glass has a refractive index nd of 1.78 to 1.84, and an Abbe's number vd of 26 to 32.

2. The optical glass according to claim 1, wherein the mass ratio (($K_2O+Na_2O+Li_2O$)/($BaO+SrO+CaO+MgO+K_2O+Na_2O+Li_2O$)) is 0.5 or less.

3. The optical glass according to claim 1, wherein a temperature difference ΔT between a crystallization peak temperature Tx and a glass transition temperature Tg is 95° C. or more.

4. The optical glass according to claim 1, wherein a liquidus temperature is 1120° C. or less.

5. The optical glass according to claim 1, wherein the optical glass comprises 0.5 to 23% of $TiO_2$, 2 to 38% of $Nb_2O_5$, and 5 to 30% of BaO.

6. A method of manufacturing a cullet raw material by blending glass raw materials and rough melting the blended glass raw materials,
   wherein the method comprises blending the glass raw materials and rough melting the blended glass raw materials using a silica melting apparatus so as to obtain a glass described in claim 1.

7. A method of manufacturing an optical glass, comprising:
   manufacturing a plurality of types of cullet raw materials by a method described in claim 6,
   remelting a raw material including at least the cullet raw materials to manufacture a molten glass, and
   molding the molten glass.

8. A method of manufacturing an optical element, comprising:
   manufacturing an optical glass by a method described in claim 7, and
   performing a molding process by reheating and softening the optical glass.

9. A glass material for press molding, which is comprised of an optical glass described in claim 1.

10. An optical element which is comprised of an optical glass described in claim 1.

* * * * *